United States Patent
Zhou et al.

(10) Patent No.: US 11,485,082 B2
(45) Date of Patent: Nov. 1, 2022

(54) DEVICE CAPABLE OF AUTOMATICALLY REPLACING SCREEN MECHANISM FOR LIGHT CURING 3D PRINTER

(71) Applicant: ZRapid Technologies Co., Ltd., Suzhou (CN)

(72) Inventors: Hongzhi Zhou, Suzhou (CN); Yinsheng Liang, Suzhou (CN)

(73) Assignee: ZRapid Technologies Co., Ltd., Suzhou (CN)

( * ) Notice: Subject to any disclaimer, the term of this patent is extended or adjusted under 35 U.S.C. 154(b) by 308 days.

(21) Appl. No.: 16/609,164

(22) PCT Filed: Nov. 6, 2017

(86) PCT No.: PCT/CN2017/109542
§ 371 (c)(1),
(2) Date: Oct. 28, 2019

(87) PCT Pub. No.: WO2019/024304
PCT Pub. Date: Feb. 7, 2019

(65) Prior Publication Data
US 2020/0055243 A1  Feb. 20, 2020

(30) Foreign Application Priority Data
Jul. 31, 2017 (CN) .......................... 201710636159.6

(51) Int. Cl.
*B29C 64/30* (2017.01)
*B33Y 30/00* (2015.01)

(52) U.S. Cl.
CPC .............. *B29C 64/30* (2017.08); *B33Y 30/00* (2014.12)

(58) Field of Classification Search
CPC ... B29C 64/245; B29C 64/124; B29C 64/129; B29C 64/135; B29C 64/227; B29C 64/232; B29C 64/236; B29C 64/241
See application file for complete search history.

(56) References Cited

U.S. PATENT DOCUMENTS

| 2007/0075459 A1* | 4/2007 | Reynolds | .............. | B29C 64/135 |
| | | | | 425/169 |
| 2012/0195994 A1* | 8/2012 | El-Siblani | .............. | B33Y 10/00 |
| | | | | 15/320 |

FOREIGN PATENT DOCUMENTS

| CN | 206066952 U | * | 4/2017 | | |
| CN | 106863811 A | * | 6/2017 | ............. | B29C 64/30 |

(Continued)

OTHER PUBLICATIONS

Telescoping (mechanics) from Wikipedia (https://en.wikipedia.org/wiki/Telescoping_(mechanics)); Page last edited: May 24, 2021 (Year: 2021).*

*Primary Examiner* — Joseph S Del Sole
*Assistant Examiner* — Ariella Machness
(74) *Attorney, Agent, or Firm* — Wang Law Firm, Inc.

(57) ABSTRACT

The present disclosure discloses a device capable of automatically replacing screen mechanism for light curing 3D printer, which comprises a resin tank and a worktable mounted on the resin tank and further comprises a screen mechanism, the screen mechanism comprises a screen exchanging assembly and a sliding assembly, the screen exchanging assembly is mounted on the sliding assembly and achieves exchanges of screens through the sliding assembly, the sliding assembly comprises at least one guide rail assembly in any angle, the screen exchanging assembly comprises at least two adjacently arranged movable screen devices, and the movable screen devices achieves front and back, left and right and any angle position exchange through (Continued)

the guide rail assembly. The present disclosure avoids a defect of time and labor consumption caused by manual replacement of the screens, reduces the labors and improves the production efficiency.

4 Claims, 2 Drawing Sheets

(56) References Cited

FOREIGN PATENT DOCUMENTS

| DE | 202016107506 U1 * | 1/2017 | ........... B29C 64/227 |
| DE | 202016107506 U1 * | 3/2017 | |

* cited by examiner

DEVICE CAPABLE OF AUTOMATICALLY REPLACING SCREEN MECHANISM FOR LIGHT CURING 3D PRINTER

TECHNICAL FIELD

The present disclosure relates to the technical field of additive manufacturing, and in particular to a device capable of automatically replacing screen mechanism for light curing 3D printer.

BACKGROUND 3D printing is introduced originally by Jim Bred and Tim Anderson in Massachusetts Institute of Technology (MIT), they design a device capable of adhering powders based on a common ink-jet printer, and such device becomes the earliest 3D printer. The roadmap for additive manufacturing (RAM) workshop held on March, 2009 formally determines to use additive manufacturing (AM), which is also called 3D printing, and provides a plan for development of the rapid prototyping technology in the next ten years. Currently, the main AM technology comprises selective laser sintering (SLS), stereolithography (SLA), fuse deposition modeling (FDM) and the like. A light curing technology uses a laser beam having a certain light intensity to irradiate liquid photosensitive resin, and the resin is rapidly cured under the irradiation of the laser beam to form a desired shape.

Currently, a light curing 3D printing device has high price, high maintenance costs, debuggers have high working intensity, and after the existing 3D printer completes the printing of a part, a screen needs to be detached and then to be mounted again, thereby undoubtedly increasing the labor intensity of the debuggers, wasting time and labors and improving production costs.

SUMMARY

To solve the above technical problems, the present disclosure provides a device capable of automatically replacing screen mechanism for light curing 3D printer, which has a reasonable structure, reduces labor intensity of the staff and improves production efficiency.

In order to achieve the above objectives, a technical solution of the present disclosure is as follows:

the device capable of automatically replacing screen mechanism for light curing 3D printer comprises a resin tank and a worktable mounted on the resin tank and further comprises a screen mechanism, the screen mechanism comprises a screen exchanging assembly and a sliding assembly, the screen exchanging assembly is mounted on the sliding assembly and achieves exchanges of screens through the sliding assembly, the sliding assembly comprises at least one guide rail assembly in any angle, the screen exchanging assembly comprises at least two adjacently arranged movable screen devices, and the movable screen devices achieves front and back, left and right and any angle position exchange through the guide rail assembly.

Preferably, each movable screen device comprises Z-axis columns mounted on the guide rail assembly, a second screw centrally penetrating the columns, a motor connected with the second screw, a fixed plate mounted on the columns, cantilever beams symmetrically mounted on two sides of the fixed plate, and a screen mounted on the cantilever beams.

Preferably, the cantilever beam is L-shaped, and one side of the cantilever beam is fixed to the fixed plate while the other side thereof is fixed to a lower surface of the screen.

Preferably, the guide rail assembly comprises a slipway mounted on one side of the worktable, two first guide rails symmetrically mounted on the slipway, a first screw mounted at a center line of the slipway and two second guide rails symmetrically mounted on the worktable, the first guide rails and the second guide rails are horizontally or vertically arranged, and each Z-axis column is mounted at the two first guide rails.

Preferably, the worktable is a marble platform.

Preferably, the device capable of automatically replacing screen mechanism for light curing 3D printer further comprises a scraper mounted on the second guide rails, and the scraper is located above the screen.

Due to the above technical solution, the present disclosure can achieve left and right screen replacement and cycle operation by using the two movable screen devices so as to reduce the labor intensity of the staff and greatly improve the production efficiency.

BRIEF DESCRIPTION OF THE DRAWINGS

To describe the technical solutions in the embodiments of the present disclosure more clearly, the following briefly introduces the accompanying drawings for describing the embodiments. Apparently, the accompanying drawings in the following description show merely some embodiments of the present disclosure, and a person of ordinary skill in the art may still derive other drawings from these accompanying drawings without creative efforts.

Figure 1:
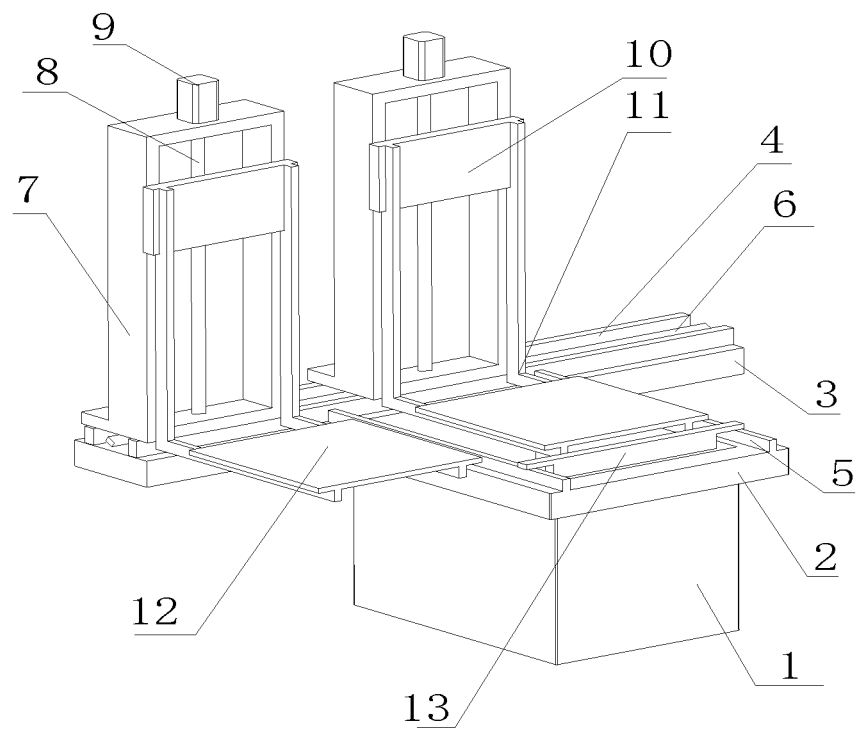
FIG. 1 is a schematic structural diagram of a device capable of automatically replacing screen mechanism for light curing 3D printer, disclosed by Embodiment 1 of the present disclosure.

In the drawings, 1—resin tank, 2—worktable, 3—slipway, 4—first guide rail, 5—second guide rail, 6—first screw, 7—column, 8—second screw, 9—motor, 10—fixed plate, 11—cantilever beam, 12—screen, and 13—scraper.

DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure. All other embodiments obtained by a person of ordinary skill in the art based on the embodiments of the present disclosure without creative efforts shall fall within the protection scope of the present disclosure.

Specific embodiments of the present disclosure will be further described in detail with reference to the accompanying drawings.

Referring to FIG. 1 to FIG. 4, a device capable of automatically replacing screen mechanism for light curing 3D printer comprises a resin tank and a worktable mounted on the resin tank and further comprises a screen mechanism, the screen mechanism comprises a screen exchanging assembly and a sliding assembly, the screen exchanging assembly is mounted on the sliding assembly and achieves exchanges of screens through the sliding assembly, the sliding assembly comprises at least one guide rail assembly in any angle, the screen exchanging assembly comprises at least two adjacently arranged movable screen devices, and the movable screen devices achieves front and back, left and right and any angle position exchange through the guide rail assembly.

Embodiment 1

Figure 2:
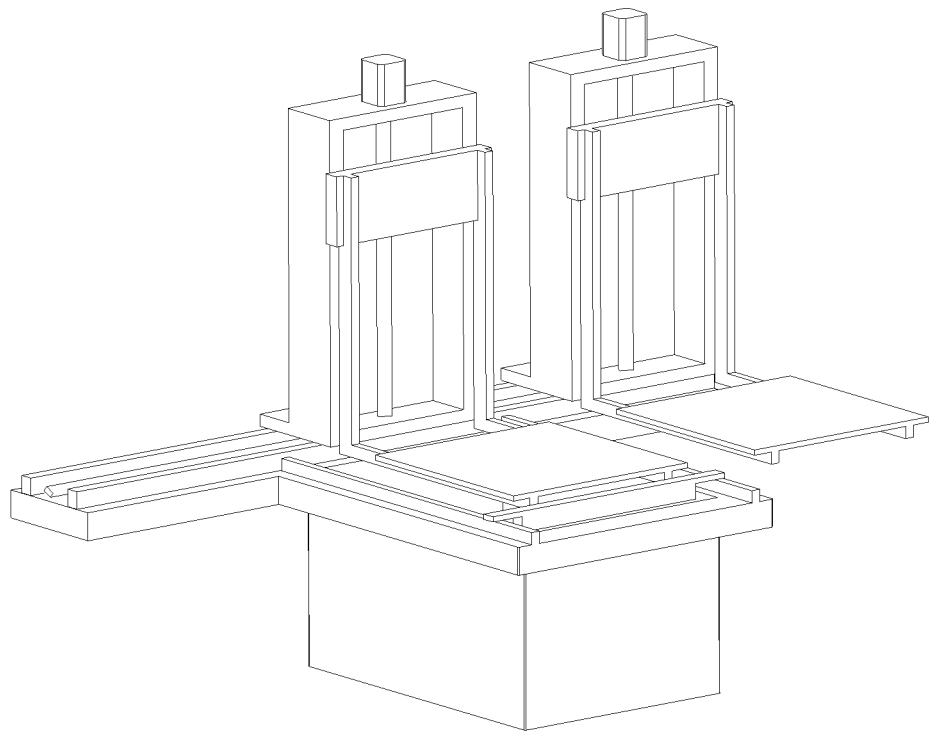
FIG. 2 is a schematic diagram showing a working state of a device capable of automatically replacing screen mechanism for light curing 3D printer, disclosed by Embodiment 1 of the present disclosure.

Continuously referring to FIG. 1 and FIG. 2, a device capable of automatically replacing screen mechanism for light curing 3D printer comprises a resin tank 1 and a worktable 2 mounted on the resin tank 1 and further comprises a screen mechanism, the screen mechanism comprises a screen exchanging assembly and a sliding assembly, the sliding assembly comprises a slipway 3 mounted on one side of the worktable 2, two first guide rails 4 symmetrically mounted on the slipway 3, a first screw 6 mounted at a center line of the slipway 3 and two second guide rails 5 symmetrically mounted on the worktable 2 in vertical to the first guide rails 4, the screen exchanging assembly comprises at least two adjacently arranged movable screen devices, each movable screen device comprises Z-axis columns 7 mounted on the first guide rails 4, a second screw 8 centrally penetrating the columns 7, a motor 9 connected with the second screw 8, a fixed plate 10 mounted on the columns 7, cantilever beams 11 symmetrically mounted on two sides of the fixed plate 10, and a screen 12 mounted on the cantilever beams 11, the cantilever beam 11 is L-shaped, and one side of the cantilever beam is fixed to the fixed plate 10 while the other side thereof is fixed to a lower surface of the screen 12. The movable screen devices in the present disclosure achieve left-right position replacement of the screens through movement of the first guide rails so as to achieve cycle operation of the screens, avoid a screen replacement operation, reduce the labor intensity of the staff and also improve the production efficiency.

Continuously referring to FIG. 1 and FIG. 2, in the present disclosure, the worktable 2 is a marble platform having a long service life so as to ensure the stability of the device.

Continuously referring to FIG. 1 and FIG. 2, in the present disclosure, the device capable of automatically replacing screen mechanism for light curing 3D printer further comprises a scraper 13 mounted on the second guide rails 5, and the scraper 13 is located above the screen 12 and ensures that the liquid level of resin in the resin tank 1 is flat so as to reduce the probability of part damage.

Embodiment 2

Figure 3:
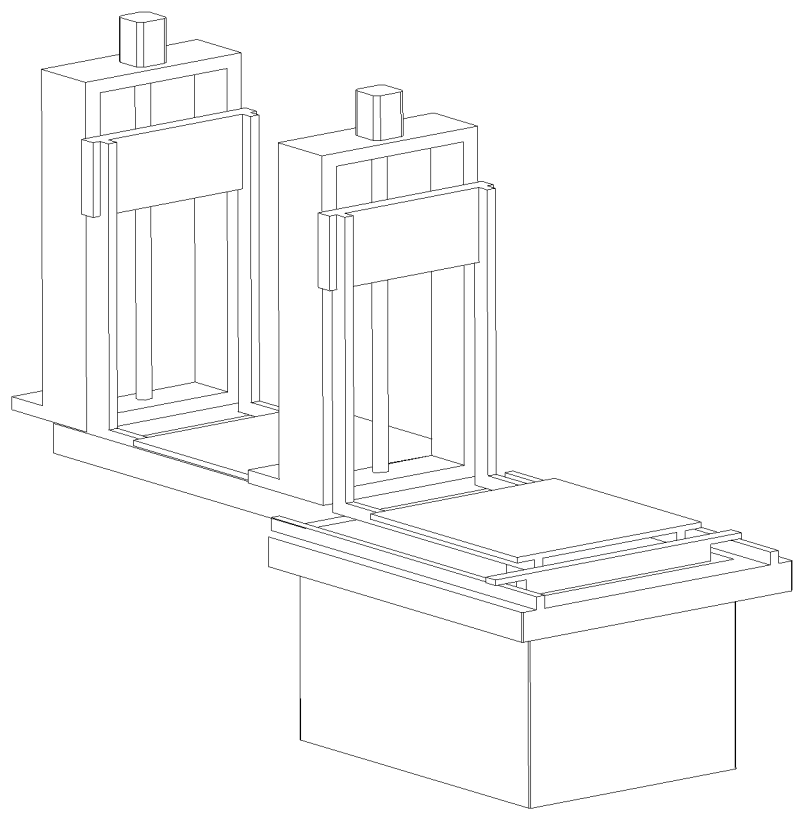
FIG. 3 is a schematic structural diagram of a device capable of automatically replacing screen mechanism for light curing 3D printer, disclosed by Embodiment 2 of the present disclosure.

Continuously referring to FIG. 3 which is a schematic structural diagram of a device capable of automatically replacing screen mechanism for light curing 3D printer, and difference between Embodiment 2 and Embodiment 1 lies in: the first guide rail is in parallel with the second guide rail to achieve front-back position replacement of the screens in Embodiment 2.

Embodiment 3

Figure 4:
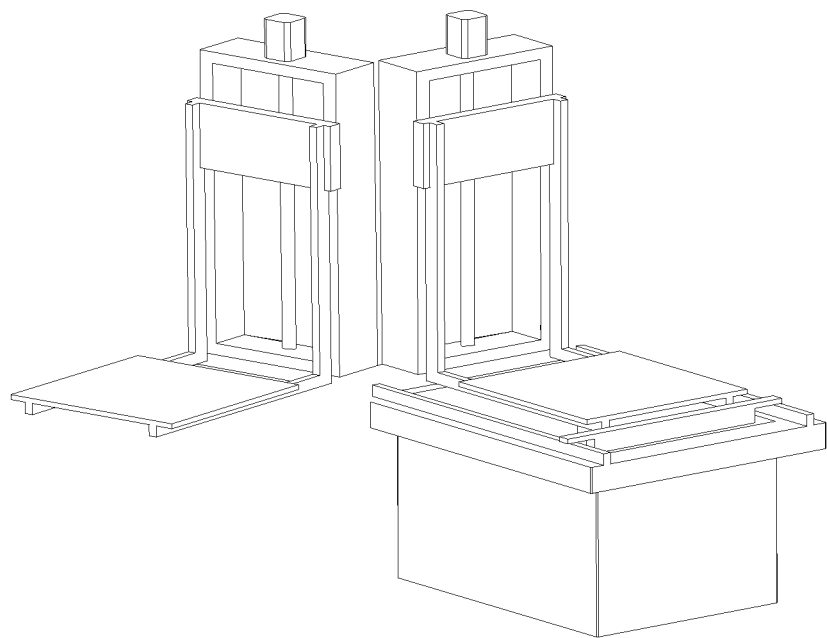
FIG. 4 is a schematic structural diagram of a device capable of automatically replacing screen mechanism for light curing 3D printer, disclosed by Embodiment 3 of the present disclosure.

Continuously referring to FIG. 4 which is a schematic structural diagram of a device capable of automatically replacing screen mechanism for light curing 3D printer, and difference between Embodiment 3 and Embodiment 1 lies in: two adjacently arranged movable screen devices are mounted on a rotating mechanism so as to achieve rotating position replacement of the screens by angle rotation in Embodiment 3.

The foregoing descriptions is merely preferred embodiments of the disclosure, it should be noted that various modifications and variations can be made by those ordinarily skilled in the art without departing from the creation and conception of the present disclosure and are within the scope of the present disclosure.

What is claimed is:

1. A device capable of automatically replacing screen mechanism for light curing 3D printer, comprising a resin tank and a worktable mounted on the resin tank, and further comprising a screen mechanism,
   wherein the screen mechanism comprises a screen exchanging assembly and a sliding assembly, the screen exchanging assembly is mounted on the sliding assembly and achieves exchanges of screens through the sliding assembly, the sliding assembly comprises at least one guide rail assembly, the screen exchanging assembly comprises at least two adjacently arranged movable screen devices, wherein the at least two adjacently arranged movable screen devices are arranged on and move within the same plane, and the movable screen devices achieves left and right position exchange through the guide rail assembly;
   wherein each movable screen device comprises Z-axis columns mounted on the guide rail assembly, a second screw centrally penetrating the columns, a motor connected with the second screw, a fixed plate mounted on the columns, cantilever beams symmetrically mounted on two sides of the fixed plate, and a screen mounted on the cantilever beams, and
   wherein the guide rail assembly comprises a slipway mounted on one side of the worktable, two first guide rails symmetrically mounted on the slipway, a first screw mounted at a center line of the slipway and two second guide rails symmetrically mounted on the worktable, the first guide rails and the second guide rails are horizontally or vertically arranged, and each Z-axis column is mounted at the two first guide rails.

2. The device capable of automatically replacing screen mechanism for light curing 3D printer according to claim 1, wherein the cantilever beam is L-shaped, and one side of the cantilever beam is fixed to the fixed plate while the other side thereof is fixed to a lower surface of the screen.

3. The device capable of automatically replacing screen mechanism for light curing 3D printer according to claim 1, wherein the worktable is a marble platform.

4. The device capable of automatically replacing screen mechanism for light curing 3D printer according to claim 1, further comprising a scraper mounted on the second guide rails, wherein the scraper is located above the screen.

* * * * *